Figure 1:
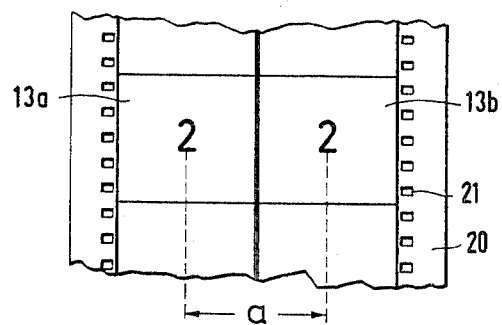

United States Patent Office 3,425,775
Patented Feb. 4, 1969

3,425,775
STEREO PROJECTOR
Jan Louis Wulff Jacobsen, Copenhagen, Denmark, assignor to CCT Cinema Camera Technik AG, Zurich, Switzerland
Filed Oct. 11, 1966, Ser. No. 585,868
Claims priority, application Germany, Oct. 21, 1965,
J 29,224
U.S. Cl. 352—57                 6 Claims
Int. Cl. G03b 35/22

The present invention relates to moving picture projectors and is particularly concerned with the projection of images that are anamorphotically compressed on the film.

In shooting and projecting anamorphotically compressed images one encounters the problem that with the conventional relatively short focal lengths in taking the pictures, very complicated anamorphotes are needed that correspond to relatively great angles of exposure. With very small angles of aperture during exposure one may use cylinder anamorphotes having a perpendicularly disposed axis for the lateral compression of the images, although the degree of compression from the center of the image to the image border becomes greater with such simple cylinder anamorphotes. On the other hand, such simple cylinder anamorphotes provide the great advantage that optically they can be much more readily corrected than anamorphotes which have an even degree of compression over the entire image angle.

The present invention as well as a proposal of the applicant which is not part of the state of the prior art is based on the discovery of using cylinder anamorphotes in taking anamorphotic film pictures and in this connection intentionally disregard the uneven lateral image compression, and in the reproduction of such unevenly compressed anamorphotic pictures to employ Brewster prisms for restoring the image. Brewster prisms have the inherent quality that they also do not compress or expand evenly over the angle of exposure. The degree of the distortion of the compression by coincidence happens to differ with cylinder anamorphotes and Brewster prisms in such a manner that for pictures taken with short focal length by means of cylinder anamorphotes, the compression errows that inevitably enter the image are almost compensated for or eliminated in the projection by a set of Brewster prisms of relatively long focal distance. These relationships regarding the focal distances exist with the taking of moving pictures: The focal distances of exposure are conventionally, and particularly with wide wall films, very short, and the reproduction focal distances are relatively great corresponding to the magnitude of the moving picture theater.

Based on the above discovery, the invention is concerned with the following individual problem: A stereo projector for anamorphotically photographed films is to be found where the lateral image compression is greater than the image compression in the center, i.e., a projector for stereo wide screen films bearing anamorphotic pictures which, for example, were taken by means of cylinder anamorphotes with the above mentioned distortion faults. Also without the necessity of anamorphotic reproduction the known proposals for stereo moving picture projectors have a number of shortcomings, the most essential of which is that the double optics or optical systems are so broad that for the normal projectors such as are installed in most movie theaters they are much to big. When using the known projectors, all lenses would have to have relatively small diameters, which, however, is undesirable because of the light conditions: The known projectors can only be used in relatively small moving picture theaters. It is known with stereo projectors to arrange the optics alongside one another at the image center distance where, of course, the axial distance between the optics must be equal to the distance of the centers of the images. The diameter of the optics in this connection is practically limited to the image center distance. To this is added the further aggravating problem that the conventional polarizing filters become very hot with stereo projection. This problem could be encountered in that an illusory magnification of the image center distance is introduced by means of mirrors, whereby then the optics can be made larger and likewise the polarizing filters that are connected in series behind them. As a result one must take into account the disadvantage that the entire optical system becomes so broad that it no longer fits into the projection machines that are available in the movie theater: Accordingly one would have to have different projectors for normal projection and for stereo projection, while it is desirable to exchange only the optics and otherwise to use the same projector for both kinds of projection. Thus the invention concerns a stereo projector with the reproduction optics arranged at a distance corresponding to the distance of image centers and means for the illusory increase of the image center distance, and resides essentially in that for reproducing anamorphotically laterally compressed film pictures, where the film compression at the lateral image borders is greater than in the center, Brewster prisms are inserted before the optics for the illusory magnification of the image center distance and for the anamorphotic restoring of the images. Thus for solving two problems, only one optical component has to be relied on: The set of Brewster prisms located in each trace of rays owing to its characteristics or qualities and the great reproduction focal distance, restores the image defects or faults that were introduced by the short focal distance exposure with the cylinder anamorphotes. Each Brewster prism in this connection also has the function of laterally displacing the pencil of rays passing therethrough in the horizontal direction, whereby the increase or magnification of the image center distance after the objectives is obtained. This has the particular advantage that also larger polarizing prisms can be utilized than was the case heretofore with those projectors where the projection was equiaxedly with the image centers, while on the other hand the two objectives of the projector in accordance with the invention can be placed alongside one another, by which means it is possible to achieve smaller installation width for the entire optics. In a particularly suitable embodiment of the invention all corresponding structural components of both objectives are arranged alongside one another, and the components whose diameter is greater than the image center distance are provided with recesses in the form of segments which contact one another at their cutting surfaces. By means of this artifice it is accomplished that the diameter of the optics can be greater than the distance of the optical axes of the two optics from one another, whereby a considerable increase of the effective surface of the optics is obtained.

Figure 3:
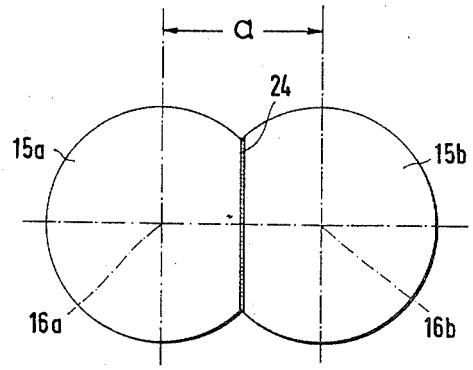
Figure 2:
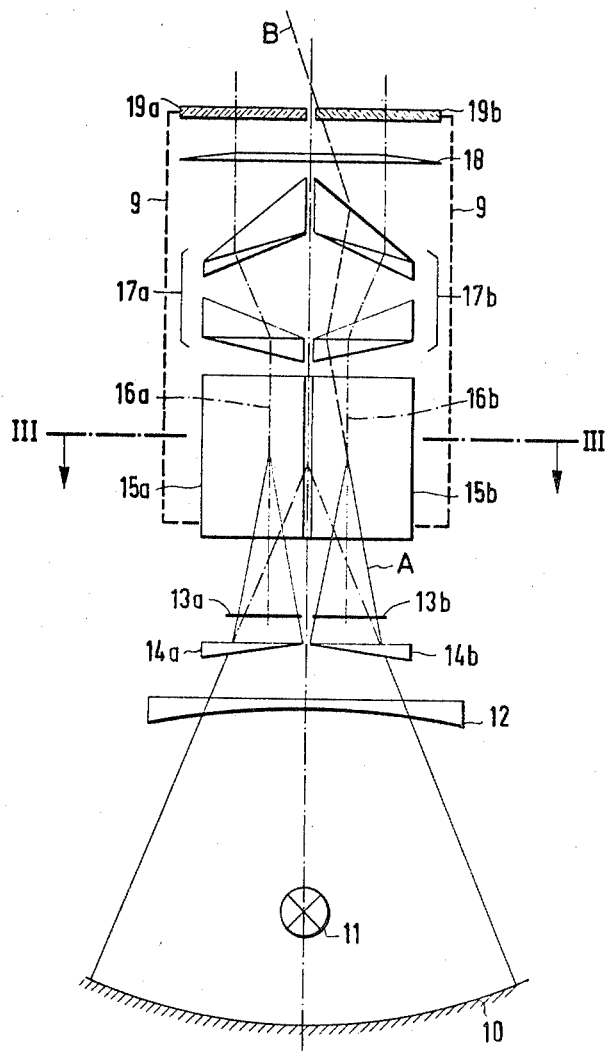

Further advantages and details of the invention will become apparent from the following description of an embodiment with reference to the accompanying drawings, in which FIG. 1 shows a section of the film provided for projection by means of the protector in accordance with the invention;

FIG. 2 is a schematic illustration of a projector in accordance with the invention as seen from the top; and FIG. 3 is a section taken along the line 3—3 in FIG. 2.

FIG. 1 illustrates a small piece of a 70 mm. wide screen film in actual size. The film is provided along the edges 20 with the conventional feed holes or perforations 21. Upon the surface corresponding to a normal wide screen picture, pictures 13a and 13b are provided. As an example the numeral "2" was chosen as an image. The two images are compressed at a ratio of 1:2 so that in the normal projection the width of the illustrated image related to the height becomes twice as great as it is seen in FIG. 1.

This film was taken by means of a camera where a cylinder lens anamorphote was placed before both objectives. As already mentioned in the beginning, there are such distortions on the image due to the short exposure focal lengths that at the sides of the two anamorphotically compressed pictures the degree of compression is greater than in the center. Thus if one would project this film without any restoring, then the objects at the outer border of the image would be unnaturally small, or the objects located in the center would be too wide. The projector shown schematically in FIG. 2 is for the projecting of films illustrated in FIG. 1.

The light required for projecting is supplied by the lamp 1 and is bunched or concentrated by means of the hollow mirror 10 in the manner illustrated approximately centrally of the optics 15a, 15b. Shortly before the bunching the light passes the film surfaces 13a and 13b. For each of the two images 13a and 13b one each projection objective 15a or 15b is used in the projector. As reflected by FIG. 3, segment portions are cut off from the sides of the optics, and the optics are connected with one another along the cut surfaces.

The optical axes 16a and 16b of the optics 15a, 15b (see FIG. 3) thus are placed at a distance a which is the distance between the image centers on the film in accordance with FIG. 1. The light from the mirror 10 passes by way of the negative cylinder lens 12 through two prisms 14a, 14b, by means of which the "sun," i.e., the pencil of light rays from the lamp 11, is divided in two in the manner shown in FIG. 2 so that an image of this source of light is located at each of the optical axes 16a and 16b. In this manner it is accomplished that the brightness over the later image surface is generally symmetric relative to the axis of the image. After passing the two prisms 14a and 14b the light passes in a known manner through the transparent film images 13a and 13b disposed essentially in the image plane of the optics or lenses 15a, 15b and through the optics. The two optics 15a and 15b are shielded from one another in that location where they are placed together (FIG. 3), for example, by a black foil 24. The optics 15a, 15b are followed by anamorphotes 17a, 17b, each of which has the same optical characteristics. Each of the two anamorphotes consists of a set of Brewster prisms, the characteristics of which are known.

By means of the Brewster prisms it is first accomplished to obtain a lateral anamorphotic stretching of the image. Furthermore, the compression faults that developed during the exposure in the manner explained above are thereby compensated, so that together with the known characteristics of the Brewster prisms the feature is exploited of working with short focal lengths for the exposure and with long focal lengths for the reproduction.

In addition there is also achieved a spacing of the optical axes 16a, 16b from one another, as indicated in dash and dot lines in the upper part of FIG. 2. The lens 18 is a collimation lens having the local length of the projection distance. Instead of a single collimation lens, it is also possible to use two separate lenses. Finally the light passes through the two polarizing filters 19, 19a, the direction of transmission of which is disposed at right angles.

Having now described my invention with reference to the embodiment illustrated in the drawings, I do not wish to be limited thereto, but what I desire to protect by Letters Patent of the United States is set forth in the appended claims.

I claim:

1. Stereo projector for double image film bearing laterally anamorphotically compressed images with the compression at the lateral image borders greater than in the center, said projector having objective means including reproducing lenses arranged with their optical axes at a distance from one another corresponding to the distance between the centers of the two images on the film and means for virtually increasing the distance between the image centers and for anamorphotically restoring the images comprising Brewster prisms disposed ahead of said lenses.

2. Stereo projector in accordance with claim 1, where said reproducing lenses are cylindrical lenses.

3. Stereo projector in accordance with claim 1, where a collimator lens means is arranged ahead of said Brewster prisms and a pair of light polarizing filters, the direction of transmission of which is disposed at right angles to one another.

4. Stereo projector in accordance with claim 1, where corresponding structural components of the objectives are disposed alongside one another and where said components, particularly said lenses, have a greater diameter than the image center to center distance with segmental portions cut away along cutting surfaces disposed proximate one another.

5. Stereo projector in accordance with claim 4, where said reproducing lenses are cylindrical lenses.

6. Stereo projector in accordance with claim 4, including a light source and means for dividing said light source including a mirror behind said light source, and a negative cylinder lens and two prisms arranged between said light source and said cylindrical lenses.

References Cited

UNITED STATES PATENTS

| 1,032,172 | 7/1912 | Zollinger. | |
| 1,714,849 | 5/1929 | Daponte | 352—62 X |
| 1,932,082 | 10/1933 | Newcomer | 352—69 X |
| 3,045,542 | 7/1962 | Finkelstein | 356—69 X |

FOREIGN PATENTS

| 462,386 | 11/1913 | France. |
| 1,075,599 | 4/1954 | France. |

JULIA E. COINER, *Primary Examiner.*

U.S. Cl. X.R.

350—181; 352—60, 69; 88—24